(12) United States Patent
Certain et al.

(10) Patent No.: US 11,196,567 B2
(45) Date of Patent: Dec. 7, 2021

(54) CRYPTOGRAPHIC VERIFICATION OF DATABASE TRANSACTIONS

(71) Applicant: Amazon Technologies, Inc., Seattle, WA (US)

(72) Inventors: Tate Andrew Certain, Seattle, WA (US); Yannis Papakonstantinou, La Jolla, CA (US); Allan Henry Vermeulen, Parksville (CA); Christopher Richard Jacques de Kadt, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/200,589

(22) Filed: Nov. 26, 2018

(65) Prior Publication Data
US 2020/0169412 A1    May 28, 2020

(51) Int. Cl.
*H04L 29/06* (2006.01)
*H04L 9/32* (2006.01)
*G06F 16/22* (2019.01)
*G06F 16/23* (2019.01)
*G06F 16/27* (2019.01)

(52) U.S. Cl.
CPC ........ *H04L 9/3247* (2013.01); *G06F 16/2246* (2019.01); *G06F 16/23* (2019.01); *G06F 16/278* (2019.01); *H04L 9/3236* (2013.01)

(58) Field of Classification Search
CPC . H04L 9/3236; H04L 9/3247; G06F 16/2246; G06F 16/23; G06F 16/278
See application file for complete search history.

(56) References Cited

U.S. PATENT DOCUMENTS

| 4,309,569 | A | 1/1982 | Merkle |
| 4,897,842 | A * | 1/1990 | Herz ............... G06F 11/277 |
| | | | 714/732 |
| 8,914,404 | B1 | 12/2014 | Kim et al. |
| 9,043,355 | B1 | 5/2015 | Kapoor et al. |
| 9,509,652 | B2 | 11/2016 | Ahn et al. |

(Continued)

FOREIGN PATENT DOCUMENTS

| EP | 818743 A2 | 1/1998 |
| EP | 1164510 A2 | 12/2001 |
| WO | 2015187187 A1 | 12/2015 |

OTHER PUBLICATIONS

International Search Report and Written Opinion dated Feb. 26, 2020, in International Patent Application No. PCT/US2019/063103, filed Nov. 25, 2019.

(Continued)

*Primary Examiner* — Sher A Khan
(74) *Attorney, Agent, or Firm* — Davis Wright Tremaine LLP

(57) ABSTRACT

A database management system receives a request to perform a transaction. The database management system commits the transaction, and in response to committing the transaction, generates a cryptographic hash based on an attribute of the transaction. The cryptographic hash is stored in a leaf-region of a hash tree. In response to a request to verify the transaction, signatures are retrieved from the tree based on a traversal of the tree to locate the node corresponding to the transaction. The retrieved signatures are used to verify the transaction.

20 Claims, 13 Drawing Sheets

(56) References Cited

U.S. PATENT DOCUMENTS

| | | | |
|---|---|---|---|
| 2002/0010701 A1 | 1/2002 | Kosciuszko et al. | |
| 2006/0047713 A1 | 3/2006 | Gornshtein et al. | |
| 2006/0190468 A1* | 8/2006 | Mihaila | G06F 16/2246 |
| 2010/0049715 A1 | 2/2010 | Jacobsen et al. | |
| 2011/0055201 A1 | 3/2011 | Burger | |
| 2015/0081623 A1 | 3/2015 | Promhouse et al. | |
| 2016/0379013 A1* | 12/2016 | Ganesan | H04L 63/0823 |
| | | | 713/176 |
| 2017/0048339 A1 | 2/2017 | Straub | |
| 2017/0075902 A1 | 3/2017 | Hoffner et al. | |
| 2017/0134260 A1 | 5/2017 | Davidson | |
| 2017/0250815 A1* | 8/2017 | Cuende | G06F 16/9014 |
| 2017/0272250 A1 | 9/2017 | Kaliski, Jr. | |
| 2017/0301047 A1* | 10/2017 | Brown | G06Q 20/3827 |
| 2017/0357680 A1* | 12/2017 | MacKovitch | G06F 16/2246 |
| 2018/0075080 A1 | 3/2018 | Hanai et al. | |
| 2018/0089041 A1 | 3/2018 | Smith et al. | |
| 2018/0129711 A1 | 5/2018 | Richardson | |
| 2018/0330349 A1* | 11/2018 | Uhr | G06Q 20/3825 |
| 2018/0331832 A1* | 11/2018 | Pulsifer | H04L 9/0637 |
| 2019/0004789 A1* | 1/2019 | Mills | H04L 63/12 |
| 2019/0004974 A1* | 1/2019 | Chhabra | G06F 12/0875 |
| 2019/0087600 A1* | 3/2019 | Sion | H04L 63/0428 |
| 2019/0182047 A1* | 6/2019 | Andreina | G06F 21/6281 |
| 2019/0188706 A1* | 6/2019 | McCurtis | G06Q 20/02 |
| 2019/0236179 A1* | 8/2019 | Priebe | G06F 16/2358 |
| 2020/0007581 A1* | 1/2020 | Vouk | H04L 63/20 |
| 2020/0052884 A1* | 2/2020 | Tong | H04L 63/123 |
| 2020/0169412 A1* | 5/2020 | Certain | H04L 9/3247 |
| 2020/0387622 A1* | 12/2020 | Falk | H04L 9/3239 |

OTHER PUBLICATIONS

International Search Report and Written Opinion, dated Feb. 21, 2020, in International Patent Application No. PCT/US2019/063058, filed Nov. 25, 2019.

Wikipedia, "Merkle tree," Oct. 30, 2018, retrieved Feb. 11, 2020, from https://en.wikipedia.org/w/index.php?title=Merkle tree&oldid= 866395282, 5 pages.

Haber et al., "How to Time-Stamp a Digital Document," The Journal of Cryptology 3(2):99-1 11, Jan. 1991.

Oberhaus, "Radioactive Material From Chernobyl Will Help Secure the Next Version of Zcash: How to use toxic waste to generate 'toxic waste,'" Feb. 14, 2018, retrieved Nov. 8, 2019 from https://www.vice.com/en_us/article/gy8yn7/power-tau-zcash-radioactive-toxic-waste, 5 pages.

Oberhaus, "The World's Oldest Blockchain Has Been Hiding in the New York Times Since 1995: This really gives a new meaning to the 'paper of record,'" Apr. 27, 2018, retrieved Nov. 7, 2019 from https://www.vice.com/en_us/article/j5nzx4/what-was-the-first-blockchain, 5 pages.

Oberhaus, "Watch This Hilarious Bitcoin Explainer Generated by an AI: Botnik strikes again with a short Bitcoin explainer made by a predictive text AI that was trained on other Bitcoin explainers," May 23, 2018, retrieved Nov. 7 from https://www.vice.com/en_us/article/xwmy9a/watch-botnik-ai-bitcoin-explainer, 4 pages.

Okrent, "The Public Editor; Paper of Record? No Way, No Reason, No Thanks," Apr. 25, 2004, retrieved Nov. 8, 2019 from https://www.nytimes.com/2004/04/25/weekinreview/the-public-editor-paper-of-record-no-way-no-reason-no-thanks.html, 4 pages.

Whitaker, "The Eureka Moment That Made Bitcoin Possible: A key insight for the technology came to a physicist almost three decades ago at a Friendly's restaurant in New Jersey," May 25, 2018, retrieved Nov. 8, 2019 from https://www/wsj.com/articles/the-eureka-moment-that-made-bitcoin-possible-1527268025, 4 pages.

Plattner, "A Common Database Approach for OLTP and OLAP Using an In-Memory Column Database," Proceedings of the 2009 ACM SIGMOD International Conference on Management of Data (SIGMOD '09), Jun. 29, 2009, 7 pages.

\* cited by examiner

CRYPTOGRAPHIC VERIFICATION OF DATABASE TRANSACTIONS

BACKGROUND

Database management systems provide facilities to store and retrieve data. Although a wide variety of database management systems exists, the most popular may be divided into one of two categories. The first category of databases, relational databases, are those built on the relational model and generally supporting tables of fixed-length records. The second category is non-relational databases, which may substitute the comparatively rigid structured query language ("SQL") with other query mechanisms. Databases of both of these categories are widely used. However, database management systems in both categories have their own respective limitations.

BRIEF DESCRIPTION OF THE DRAWINGS

Various techniques will be described with reference to the drawings, in which.

DETAILED DESCRIPTION

Figure 1:
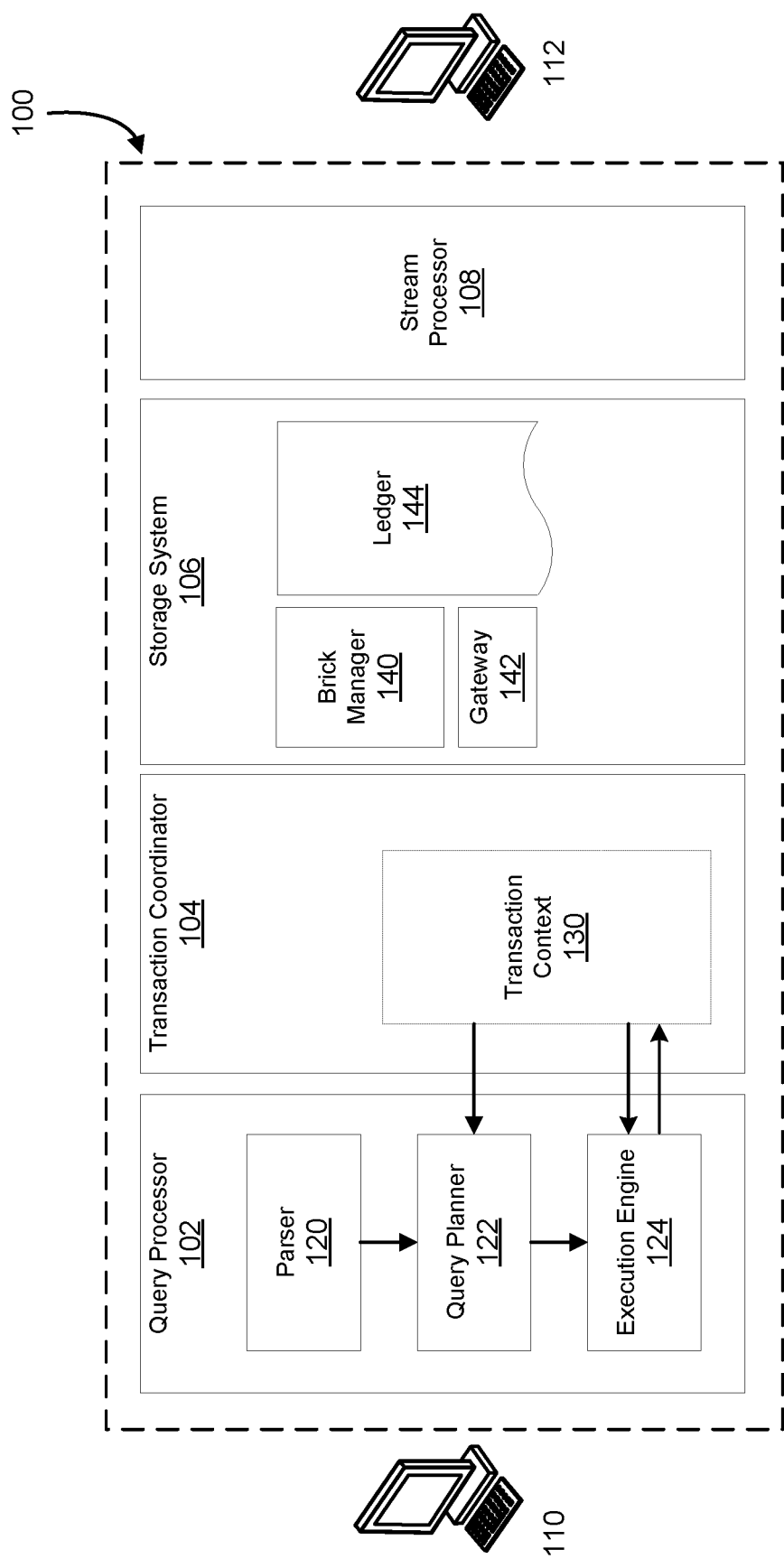
FIG. 1 illustrates a ledger-based database system, in accordance with an embodiment.

Described herein are systems and techniques related to the operation of a ledger-based database management system. A ledger, as used herein, comprises journal and summary data structures adapted for use in a database management system. A journal stores an immutable history of transactions performed on a document managed by the system, and a summary provides a synopsis of the document's current state.

The systems and techniques described herein further relate to the ledger-based database management system providing a cryptographic verification feature. In embodiments described herein, the journal stores a history of transactions, and a cryptographic hash tree structure provides independent verification that the history of transaction is unaltered. The cryptographic hash tree structure is further adapted to sustain high throughput and large transaction volumes.

In an example embodiment, a ledger-based database management system receives requests to perform transactions, and commits those transactions independently of a cryptographic verification mechanism. The independence of the cryptographic verification mechanism from the transaction processing permits the transaction processing to sustain high throughput and large transaction volumes.

In the example embodiment, the ledger-based database management system responds to commitment of the transaction by storing a node in the leaf-region of a hash tree. A hash tree, as used herein, refers to a structure in which cryptographic hashes are stored. A hash tree may sometimes be referred to as a signature tree, cryptographic verification tree, hash signature tree, and so forth. A cryptographic hash may refer to a cryptographic signature, and may also be described herein as a hash. The added node comprises a signature generated based on one or more attributes of the transaction. Nodes are added to the tree in a manner which limits the region of the tree that require calculation or recalculation when a new signature is added to the tree. In an embodiment, the tree is structured and managed such that a region of the tree may reach a finalized state, in which the signatures in the region no longer require recalculation and can be treated as stable.

In the example embodiment, the ledger-based database management system receives a request to verify a previously committed transaction. In response, the system provides one or more signatures retrieved from the hash tree, where the provided signatures are those retrieved during a traversal of the tree to locate a node that corresponds to the transaction, and which are usable to cryptographically verify that the integrity and order of the record of the transaction has not been compromised.

In another example embodiment, a ledger-based database management system provides access to the history of transactions stored in the ledger. The example system receives various queries and command from a client of the system, such as query language commands to insert, update, and delete documents stored in tables managed by the system. The example system can also respond to queries of the tables—these are processed based at least in part on access to summary components of the ledger. To provide access to the history of transactions, the system also supports queries directed to the journal components of the ledger. These queries, which may be described as journal queries, are written against a journal table schema which is derived by the system from the schema of the corresponding document table. The system generates results for a journal query by scanning and retrieving data from the journals, and projecting the retrieved data in accordance with the schema of the journal table and the query. In various aspects, queries of the journal tables may include requests to verify a transaction and/or provide access to cryptographic signatures stored in the hash tree.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

As one skilled in the art will appreciate in light of this disclosure, certain embodiments may be capable of achieving certain advantages, including that embodiments disclosed herein provide high transaction commit rates coupled with the ability to provide cryptographic verification of the integrity of the committed transactions.

FIG. 1 illustrates a ledger-based database system, in accordance with an embodiment. The example ledger-based database system 100 comprises a query processor 102, transaction coordinator 104, storage system 106, and stream processor 108.

A client device 110 may send queries to the database system 100. Here, a query refers to a request for information to be retrieved by the database system 100, expressed in accordance with a query language definition and a schema. For example, a query might be expressed in structured query language ("SQL"), or a variant thereof, and might further conform to the schema of a table referenced by the query. Schema refers to the names and structure of a table or other element, such as a view or index. A query that conforms to a schema refers to names and structures consistent with the schema. For example, the projection clause of a query may generally refer only to columns of a table that exist in the corresponding schema, except for special circumstances such as projection columns that are defined by the query itself.

A client device 112 may also access stream functions of the distributed database system 100. Alternatively, various hosted services may access stream functions. Here, stream functions refers to features of the distributed database that relate to direct and/or immediate access to a stream of transactions processed by, about to be processed by, or being processed by, the database system 100.

In an embodiment, a query processor 102 comprises a module operative on a computing device comprising at least one processor and a memory. As used herein, a module or sub-module refers to a portion of the memory in which processor-executable instructions are stored, where the instructions, when executed by the processor, cause the computing device to perform the functions attributed to the module. The query processor 102 performs functions related to processing queries received from the client device 110. The query processor 102 may comprise a parser 120, query planner 122, and execution engine 124. The database system 100 may comprise a fleet of query processors similar to the query processor 102 depicted in FIG. 1, to facilitate scaling.

In an embodiment, the parser 120 performs lexical and semantic analysis of a received query. This may include converting textual components of the received query to non-textual data structures, such as abstract syntax trees. It may further involve determining whether the query is syntactically valid, and valid with respect to any relevant schemas.

In an embodiment, the query planner 122 determines a plan for executing the received query. This may involve identifying various approaches to executing the query, estimating the costs of the various approaches, and selecting a plan believed by the query planner 122 to be most optimal. The query planner 122 may rely on various statistics, some of which may be provided by the storage system 106, regarding the amounts of relevant data stored by the storage system 106, how long it might take to scan or retrieve the relevant data, and so forth.

In an embodiment, the execution engine 124 obtains a plan for executing the query from the query planner 122, and executes the plan. Executing the plan may generally involve initiating scanning and retrieval of data, and assembling the results of the query. The execution engine, for example, may process a query by initiating a scan of a summary table or journal, or initiating some other operation, in order to retrieve data relevant to the query. The scanning and retrieval is performed by the storage system 106. The execution engine, in cases and embodiments, assembles the results of the query by performing join operations, filtering operations, and so on. The execution engine also applies a projection, as reflected in the original query and in the query plan. This step ensures that the assembled results conform to the expected schema.

In an embodiment, a transaction coordinator 104 comprises a module operative on a computing device comprising at least one processor and a memory. The transaction coordinator 104 can be co-located on a computing device with other modules, such as the query processor 102, or it may be located on a separate computing device. The database system 100 may comprise a fleet of transaction coordinators similar to the transaction coordinator 104 depicted in FIG. 1, to facilitate scaling.

The transaction coordinator manages query execution and command execution, to implement transactional properties such as atomicity, consistency, isolation, and durability. These are sometimes referred to as "ACID" properties. The transaction coordinator 104 communicates with the query processor 102 and storage system 106 to ensure that queries and command intended to be performed in a transaction context 130, are executed according to desired levels of ACID conformance.

In an embodiment, a storage system 106 comprises a module operative on a computing device comprising at least one processor and a memory. The storage system 106 can be co-located on a computing device with other modules, or located on a separate computing device. The database system 100 may comprise a fleet of storage systems similar to the storage system 106 depicted in FIG. 1, to facilitate scaling. The storage system 106 may comprise various sub-modules, including a brick manager 140, gateway 142, and ledger 144. Further aspects of these components of the storage system 106 are described herein. In general, the storage system 106 is responsible for performing storage and retrieval operations on the ledger 144.

In an embodiment, a stream processor 108 comprises a module operative on a computing device comprising at least one processor and a memory. The stream processor 108 can be co-located on a computing device with other modules, or located on a separate computing device. The database system 100 may comprise a fleet of stream processors similar to the stream processor 108 depicted in FIG. 1, to facilitate scaling. The stream processor 108 provides direct or immediate access to a stream of transactions processed by, about to be processed by, or being processed by, the database system 100. Various client devices and hosted client applications, such as the depicted client device 112, may access the stream of transactions and respond to the transactions as they occur.

Figure 2:
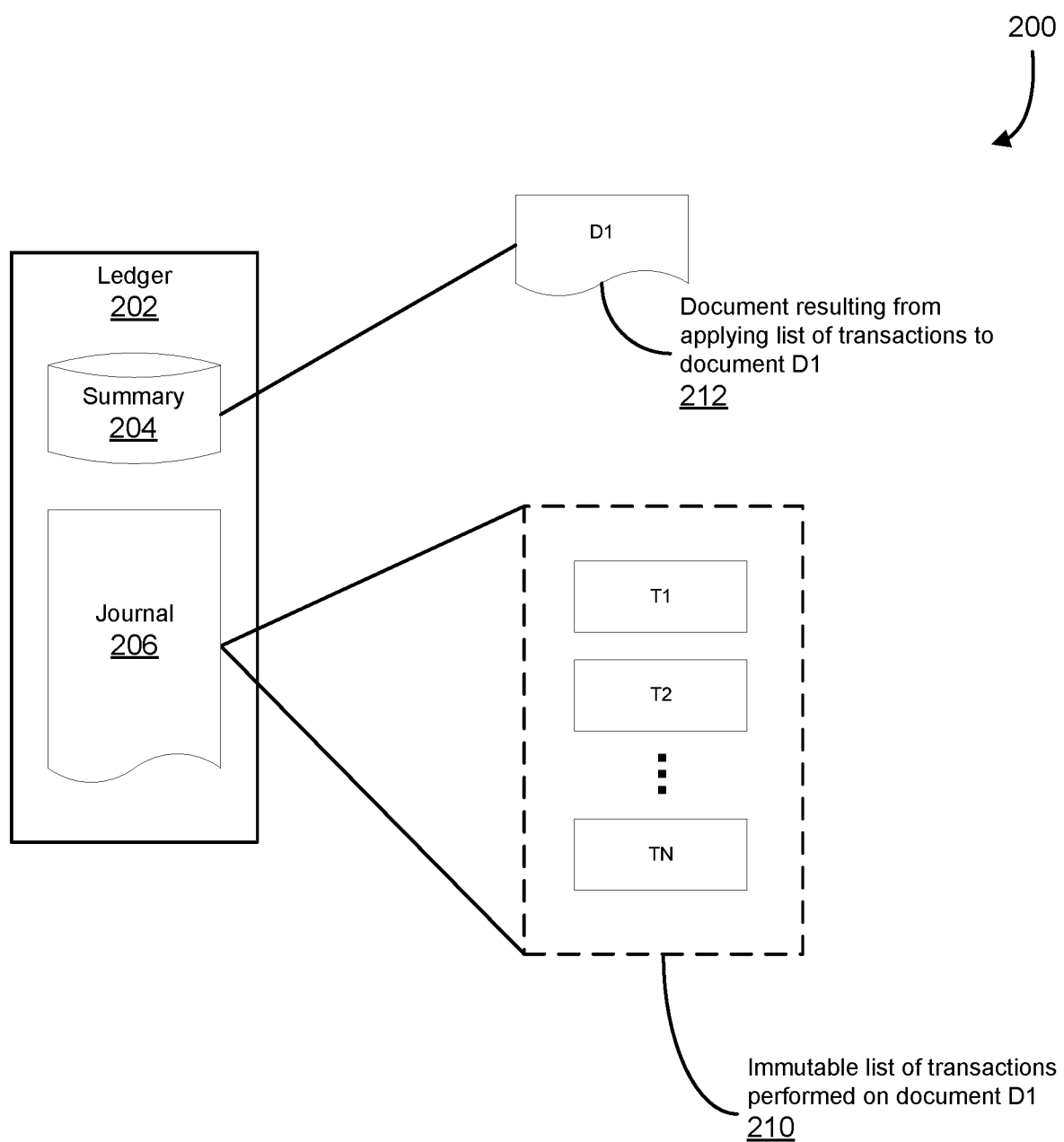
FIG. 2 illustrates distributed storage of a ledger used in conjunction with a ledger-based database system, in accordance with an embodiment.

The database system 100 of FIG. 1 is described as being ledger-based because it uses a ledger as its underlying storage structure. FIG. 2 illustrates distributed storage of a ledger used in conjunction with a ledger-based database system, in accordance with an embodiment. The ledger 202 of FIG. 2 may therefore correspond to the ledger 144 that FIG. 1 depicts.

The principal components of a ledger are one or more journals of immutable transactions, and a summary that reflects the results of those transactions. As depicted in the example 200 of FIG. 2, a ledger 202 comprises a journal 206 and a summary 204. The ledger 202 of FIG. 2 corresponds to the ledger 144 of FIG. 1.

The ledger 202 comprises a list of immutable transactions applied to documents or other data maintained by the distributed database 100. For example, the ledger 202 might comprises a list 210 of transactions performed on a document Dl. The transactions are considered immutable because, once entered into the journal 206, they are neither changed nor deleted. The journal 206, in various embodiments, thus contains a complete and verifiable history of all changes made to the document Dl.

The ledger 202 further comprises a summary 204. The summary 204 reflects the contents or state of each document stored in the database after applying all of the committed transactions, in order. For example, the summary 204 might contain the document 212 resulting from applying the list 210 of transactions applied to the document Dl.

In various embodiments, the database system 100 supports queries of tables and views, and the use of indexes, in a manner that at least appears to the user to be similar to that of traditional relational database management systems. The database system 100, in various embodiments, provides a session-based transactional application programming interface ("API"). Through the interface, using a superset of SQL, client devices may interact with documents, tables, views, and indexes, despite the difference in the underlying storage structures.

Figure 3:
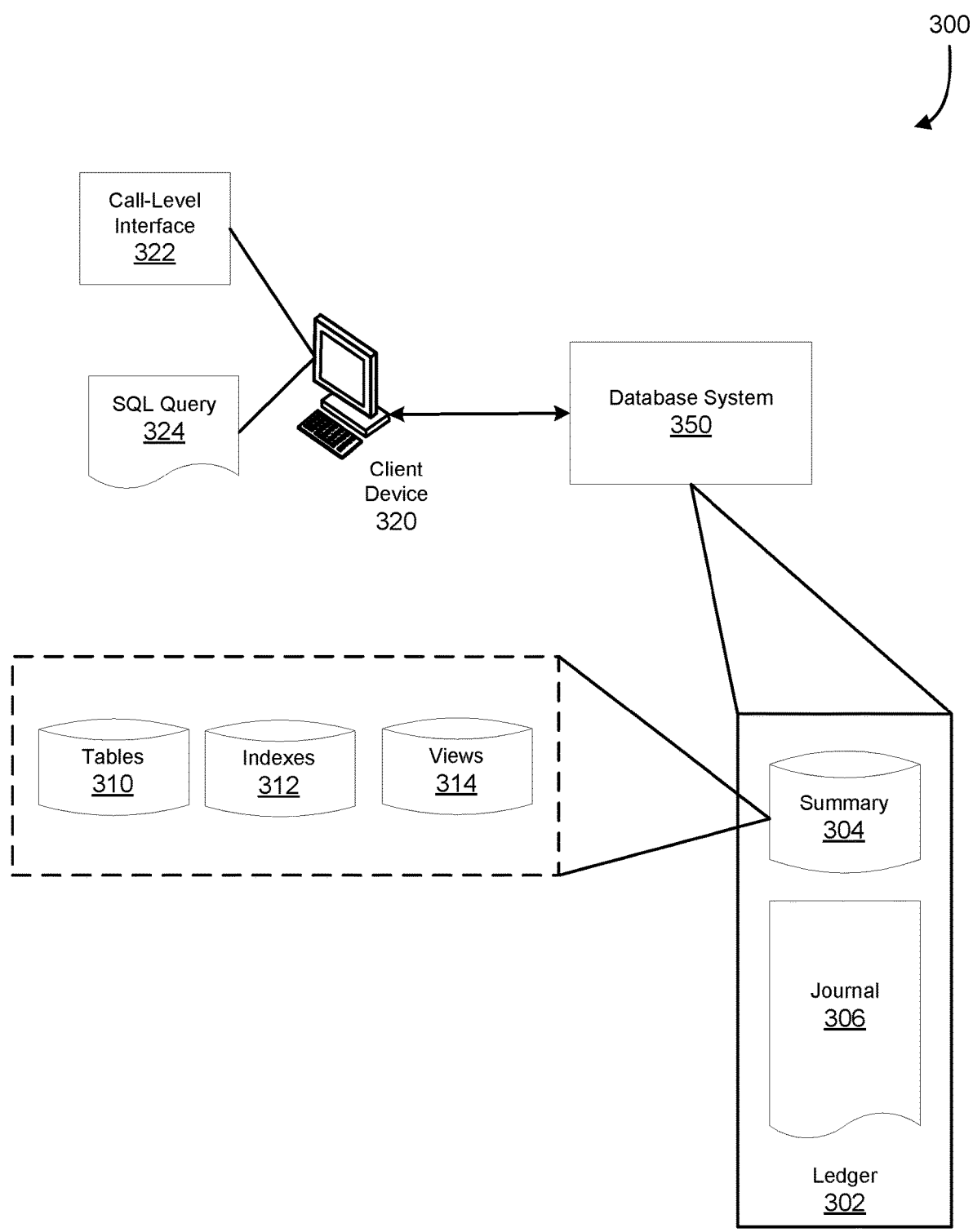
FIG. 3 illustrates aspects of query processing in a ledger-based database system, in accordance with an embodiment.

FIG. 3 illustrates aspects of query processing in a ledger-based database system, in accordance with an embodiment. In the example 300 of FIG. 3, the ledger 302, summary 304, and journal 306 may correspond to the ledger, summary, and journal depicted in FIG. 2.

In various embodiment, a client device 320, or more generally a client process, sends a SQL query 324 to a database system 350, using a call-level interface 322. The database system 350 depicted in FIG. 3 may correspond to the database system 100 depicted in FIG. 1. The call-level interface 322 can be an API for interacting with a database system, such as various available connectivity interfaces. The SQL queries 324 can be queries expressed in SQL, or a superset or subset thereof. Note, however, that the use of SQL in this example should not be construed so as to limit the scope of the present disclosure to embodiments which use SQL. Embodiments may use any of a wide variety of query languages.

The summary 304 stores data that represents the current state of the ledger's tables 310, indexes 312, and views 314. Aspects of storage techniques for the summary data are described below, regarding FIG. 7.

A query, such as the SQL query 324, can be processed in view of the data contained in the summary 304. For example, a query execution plan might rely on current data stored in the summary, such as index data, to efficiently execute a query. The query execution plan might further rely on current values for elements of a document when applying a projection.

Figure 4:
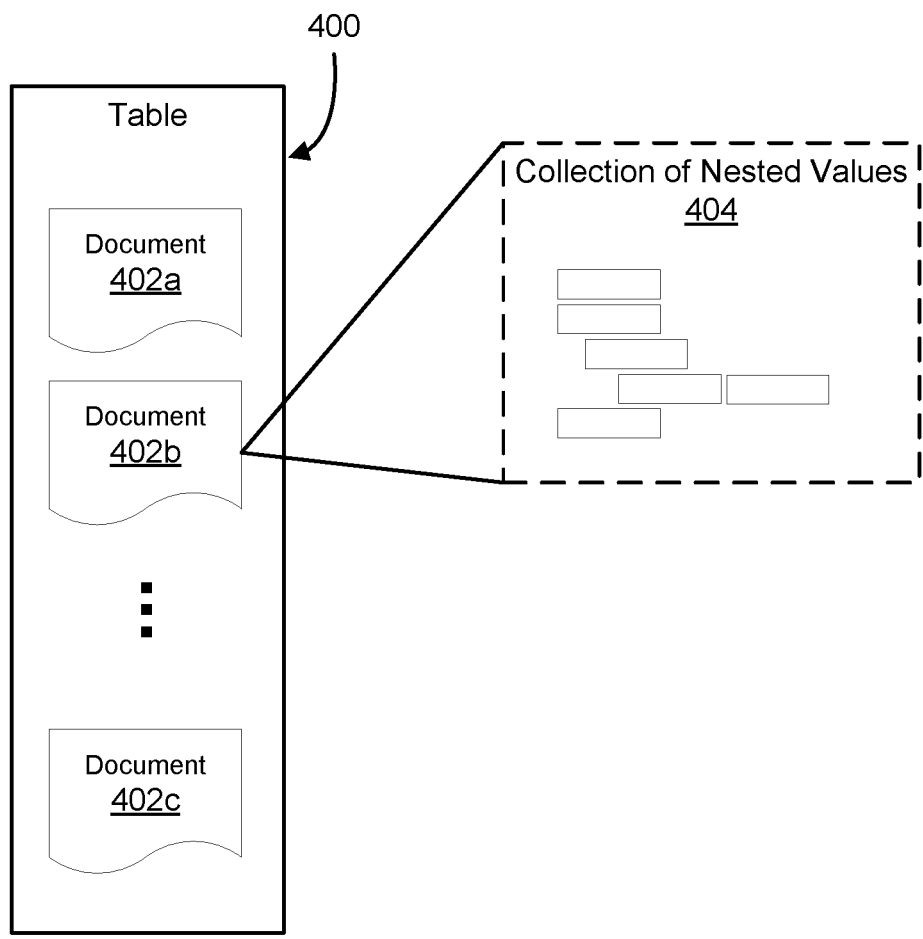
FIG. 4 illustrates a table structure of a ledger-based database system, in accordance with an embodiment.

The tables of the database system 100 are logically organized as collections of documents. FIG. 4 illustrates a table of a ledger-based database system, in accordance with an embodiment. As depicted by FIG. 4, a table 400 comprises a collection of documents 402a-c. A document 402 might also be described as a row of the table. However, in various embodiments, each document can comprise a collection of nested values 404. Accordingly, embodiments may support more loosely structured data than what is typically supported by conventional database management systems.

The example table 400 may generally be treated as a logical entity exposed to a client device via a query language, rather than a physical data storage structure. As described herein, the data for the table 400 is stored using a ledger comprising journal and summary portions.

Figure 5:
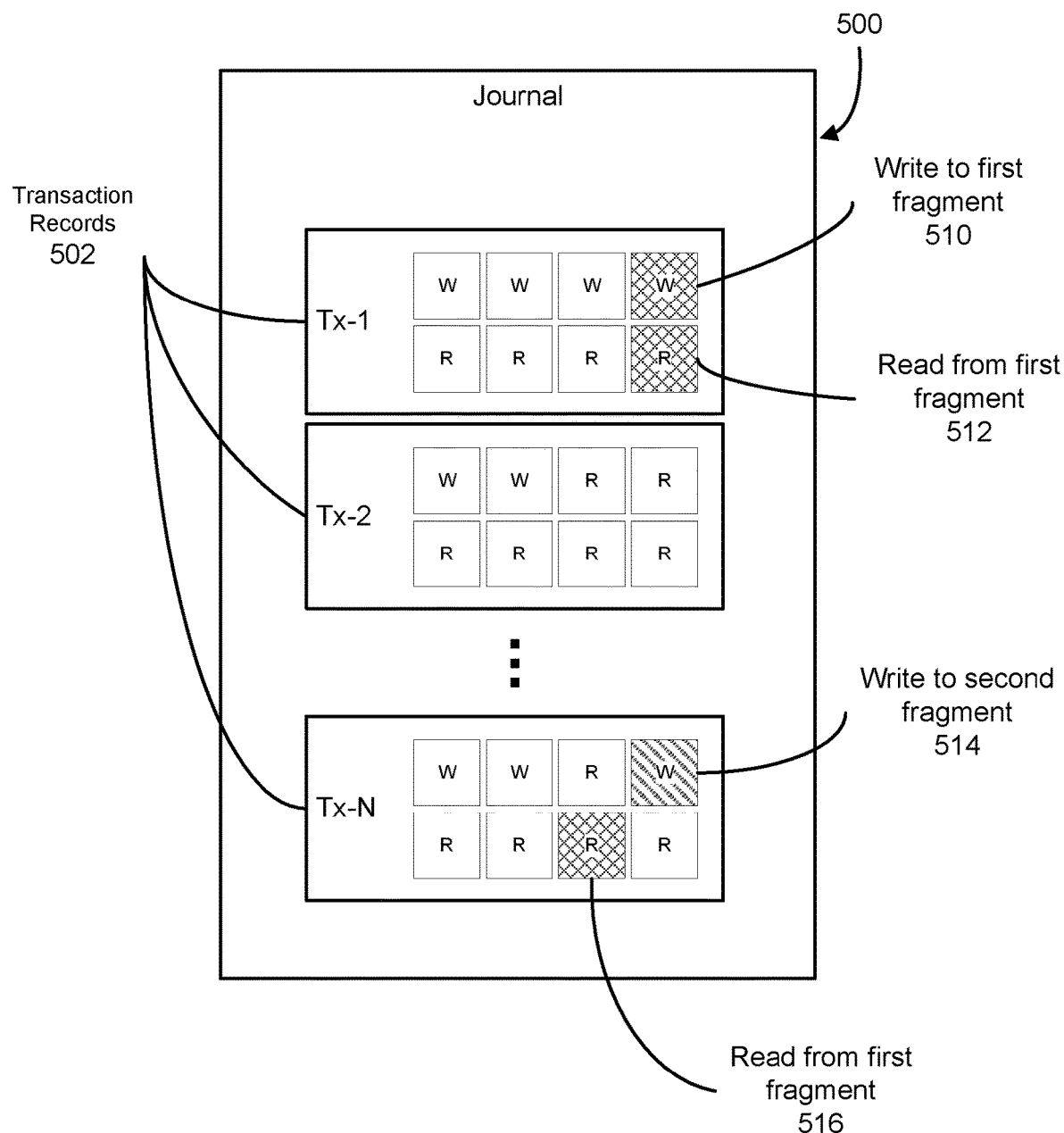
FIG. 5 illustrates a journal, in accordance with an embodiment.

FIG. 5 illustrates a journal, in accordance with an embodiment. In the example of FIG. 5, a journal 500 comprises an immutable, append-only list of transaction records 502. Each of the transaction records 502 comprises data indicative of a read or write operation to a document. There is at least one such chain, or sequence, of transactions for every document represented in the journal 500.

In an embodiment, such as the embodiment depicted in FIG. 5, the transaction records comprise data indicative of a data fragment associated with the read or write operation. For example, in FIG. 5, data is stored indicating that Tx-1 comprises a write to a first fragment 510 and a read from the first fragment 512. Likewise, transaction Tx-N comprises a write to a second fragment 514 and a read from the first fragment 516.

Figure 7:
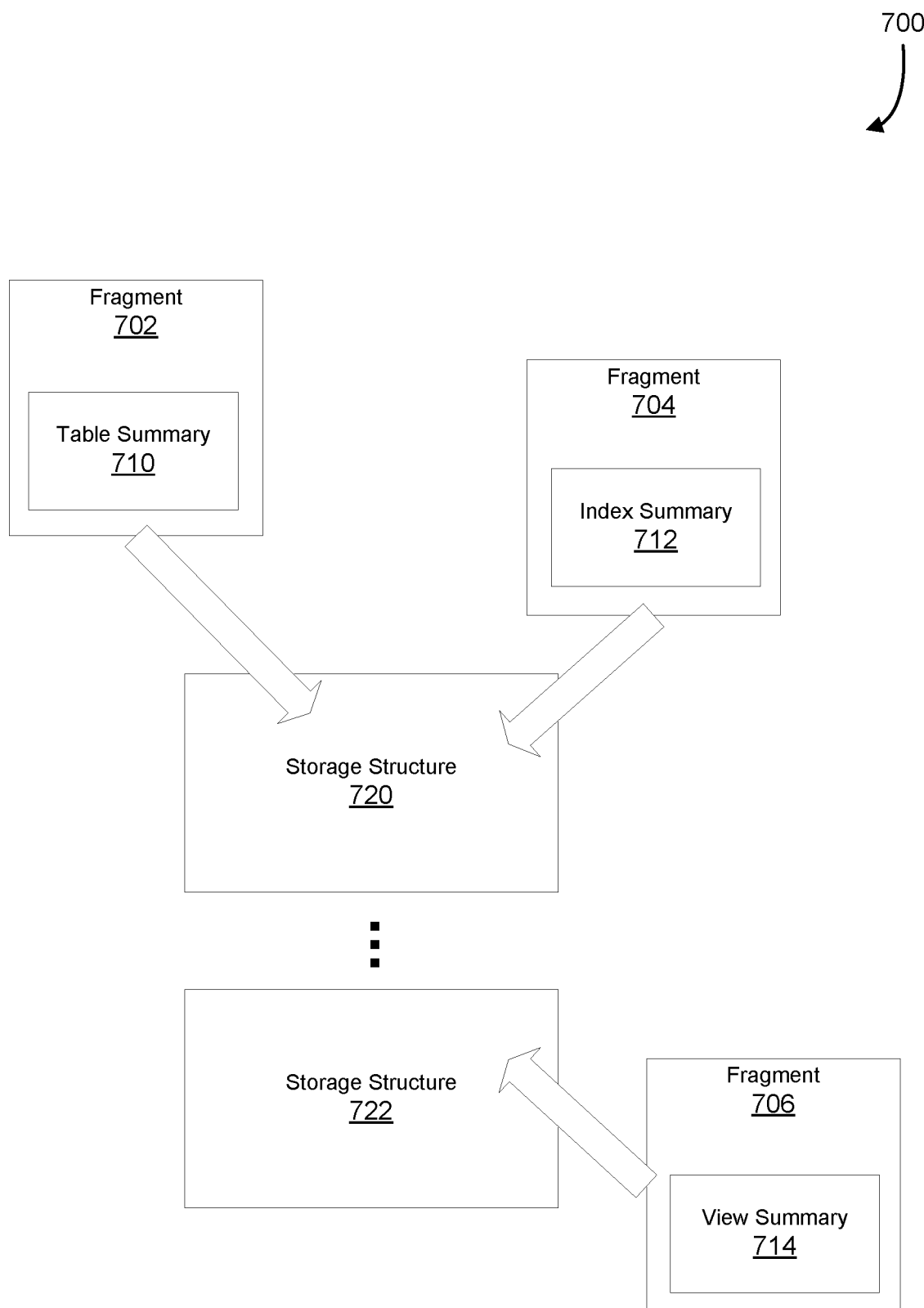
FIG. 7 illustrates aspects of a storage technique for summary data, in accordance with an embodiment.

More generally, the journal 500 comprises transaction records 502 which comprise data indicative of changes made both to a logical document and to the underlying storage structure for the journal. FIG. 7 describes aspects of the storage structure.

As depicted in FIG. 5, entries in the journal 500 are stored to reflect an immutable order, in the same sequence as the transactions were applied. For example, Tx-N represents the oldest transaction, Tx-2 the second most recent transaction, and Tx-1 the most recent. The journal 500 thus provides a complete history of the changes made to each document that is represented in the journal 500.

Figure 6:
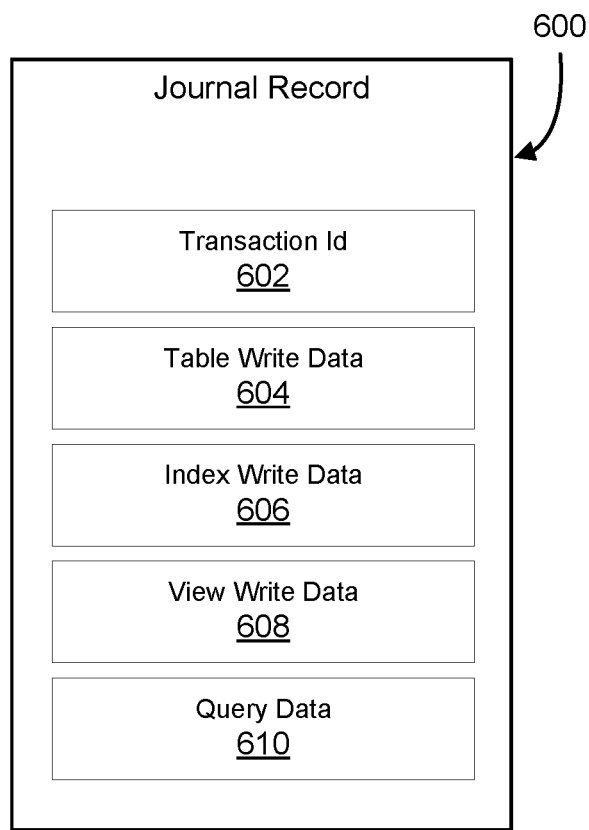
FIG. 6 illustrates aspects of a journal record, in accordance with an embodiment.

FIG. 6 illustrates aspects of a journal record, in accordance with an embodiment. In the example of FIG. 6, a journal record 600 describes various aspects of a transaction. In an embodiment, the journal record might correspond to or be an aspect of one of the transactions Tx-1, Tx-2, . . . Tx-N depicted in FIG. 5.

As depicted in FIG. 6, a journal record 600 comprises, in an embodiment, a transaction identifier 602. The transaction identifier 602 may be a sequence number, timestamp, cryptographic hash, and so forth. Note that in some embodiments, cryptographic techniques may be used to safeguard the integrity of the journal record 600 and the journal 500, including safeguards which ensure that the ordering of transactions is preserved. Embodiments may use transaction identifiers 602, or other data included in the journal record, as an aspect of these safeguards.

In an embodiment, the journal record 600 comprises table write data 604. The table write data represents modifications made to a table in the corresponding transaction. For example, the table write data 604 might represent changes made to any documents stored in a table as a result of the transaction.

In an embodiment, the journal record 600 comprises index write data 606. The index write data represents modifications made to an index as a consequence of the corresponding transaction. Likewise, in an embodiment, the journal record 600 comprises view write data 608, which represents modification made to a view as a consequence of the transaction.

In an embodiment, the journal record 600 comprises query data 610, representing a SQL command, query language command, or other command on which the transaction was based. This data may be stored for diagnostic purposes.

As described with reference to FIGS. 5 and 6, a journal record comprises, in various embodiments, references to storage fragments affected by a transaction. FIG. 7 illustrates aspects of a storage technique for summary data which utilizes storage fragments, in accordance with an embodiment.

As depicted in the example 700 of FIG. 7, a number of storage structures 720, 722 store fragments 702-706. Each one of the fragments 702-706 resides on a single one of the storage structures 720, 722. In embodiments, each storage structure resides on a single storage node. A storage node comprises a computing device with at least one processor, a memory, and a storage device such as a flash driver, mechanical disk drive, network attached storage, and so forth.

In various embodiments, a given fragment 702 of a summary is a set of records that are managed by the database system 100 as a unit. The summary is fragmented so that every record in a summary is in exactly one fragment. Each fragment contains only record summaries for any one table, index, or view. For example, a first fragment 702 might comprise data for a table summary 710, a second fragment 704 might comprise an index summary 712, and a third fragment might comprise a view summary 714. In some embodiments, each summary corresponds to exactly one fragment, although in other embodiments a summary may be split across fragments. A fragment is sized so that a large number of records can fit into a single fragment, but is not so large that the time required to do a full scan of the fragment is excessive.

A storage structure, such as any of the depicted storage structures 720, 722, comprises a data structure for storing data. Examples of such structures include, but are not limited to, B-trees, hash buckets, and heap trees. Suitable storage structures provide a scan capability, and may also provide filtering, scan-and-filter, and so forth.

In an embodiment, a given storage structure 720 may store multiple fragments. In other embodiments, a given storage structure 722 stores only a single fragment 706. In some embodiments, a given fragment is replicated to multiple storage structures.

In an example embodiment, a ledger-based database management system provides access to the history of transactions stored in the ledger. The example system receives various queries and command from a client of the system, such as query language commands to insert, update, and delete documents stored in tables managed by the system. The example system can also respond to queries of the tables—these are processed based at least in part on access to summary components of the ledger. However, in order to provide access to the history of transactions, the system supports queries directed to the journal components of the ledger. These queries, which may be described as journal queries, are written against a journal table schema which is derived by the system from the schema of the corresponding document table. The system generates results for a journal query by scanning and retrieving data from the journals, and projecting the retrieved data in accordance with the schema of the journal table and the query.

In another example, a method of operating a ledger-based database management system includes storing data for a document table as a journal of transactions. The journal of transactions includes records which describe changes applied to one or more documents of the document table. The method further includes receiving a query of a journal table, which may be described as a table of transactions performed on the document table. In response to the query, the method includes generating results by at least retrieving and projecting the journal records in accordance with a journal table schema and the query, such that the results of the query are indicative of the changes applied to the at least one document of the first table.

Figure 8:
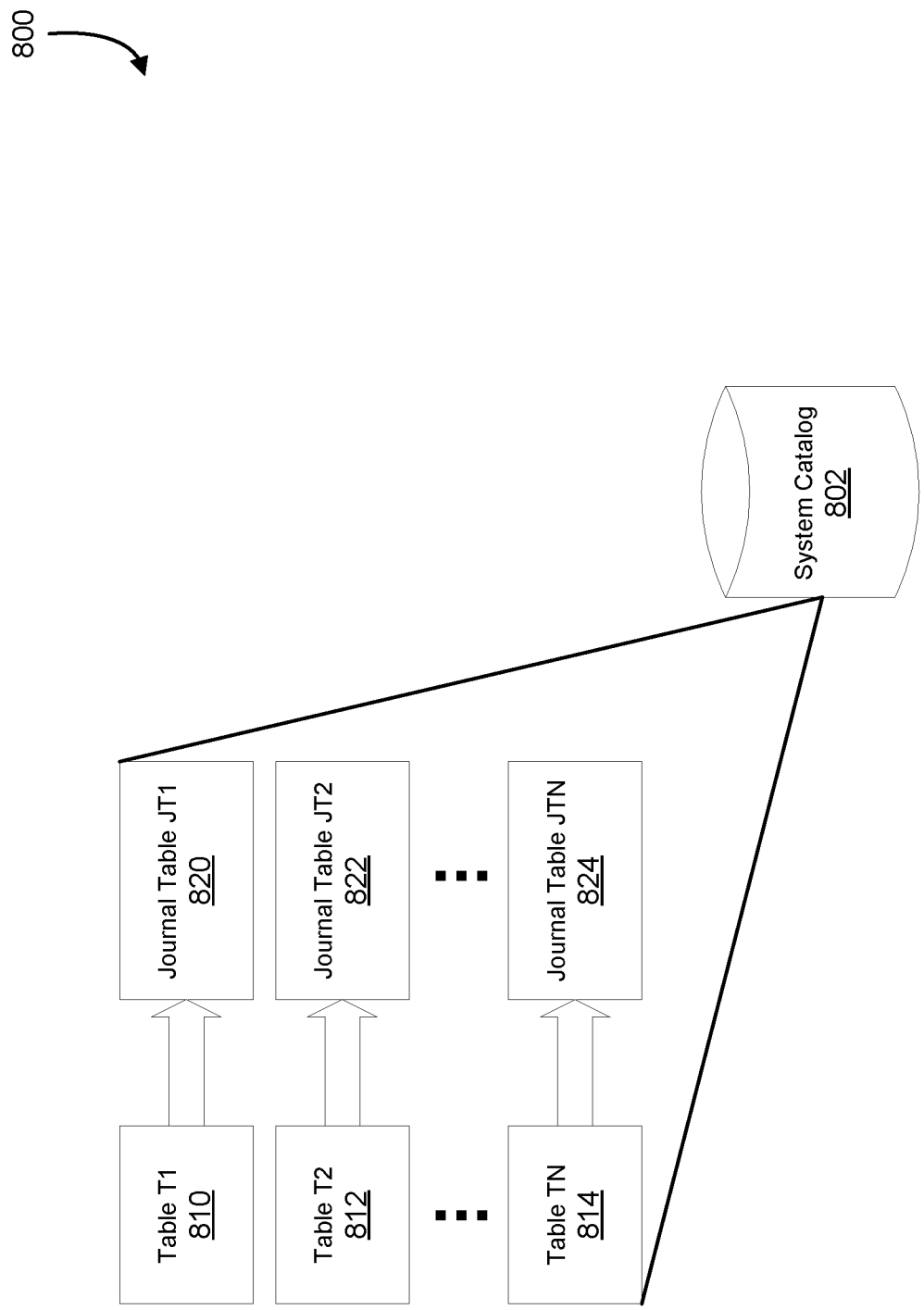
FIG. 8 illustrates aspects of processing queries of journal tables, in accordance with an embodiment.

FIG. 8 illustrates aspects of processing queries of journal tables, in accordance with an embodiment. As depicted by the example 800 of FIG. 8, a system catalog 802 comprises, in an embodiment, a list of tables 810-814 that are defined in the database. Here, a table being defined refers to the table and its schema being known to the database, regardless of whether or not the table is materialized. In various embodiments, a data definition language ("DDL") command is executed to define the table. In embodiments, defining the table comprising storing its definition in the system catalog 802.

The database system 100 defines a corresponding journal table 820-824 for each corresponding table 810-814. A journal table is a table of documents, and thus the logical structure of the journal tables 820-824 is similar to that of the other tables 810-814. Moreover, the schema of each journal table 820-824 is based on the schema of the corresponding table 810-814. For example, if a table T1 has a column C1, the corresponding journal table JT1 will have one or more columns based on C1. The journal table JT1 might, for example, include a row to represent every change to a document stored in the table T1, and each row might have a column describing a change to the property of the document that corresponds to C1.

Figure 9:
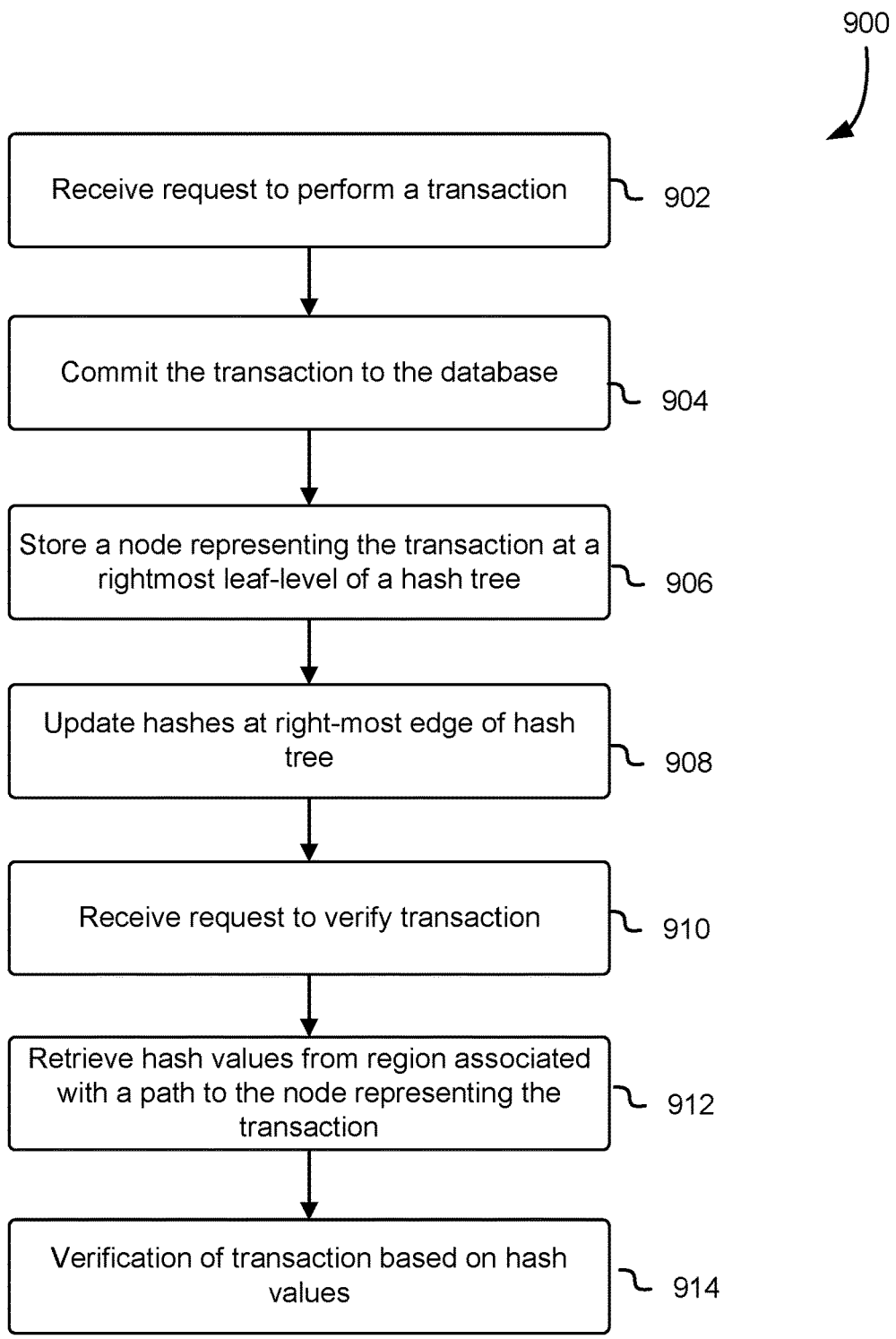
FIG. 9 illustrates a process for maintaining transaction verification data, in accordance with an embodiment.

FIG. 9 illustrates a process for maintaining transaction verification data, in accordance with an embodiment. Although FIG. 9 is depicted as a sequence of steps, the depicted sequence should not be construed as limiting the scope of the present disclosure to only those embodiments conforming to the depicted order. For example, unless otherwise indicated or clear from context (e.g., when the output of one step is used as input into another), at least some of the depicted steps may be reordered or performed in parallel.

At 902, the database system 100 receives a request to perform a transaction. In embodiments, the request is received at a network buffer, read by operating system components, and provided to a query processor of the database system. The query processor may identify operations based on and in accordance with the request, and provide those operations to a transaction coordinator, such as the transaction coordinator depicted in FIG. 1. Then, as depicted by step 904, the transaction coordinator commits the transaction to the database. Here, committing the transaction refers to durably recording the transaction and making its effects permanent. For example, an entry indicative of an update to a table may be added to an immutable, append-only journal, such as the journal depicted in FIG. 1.

Figure 10:
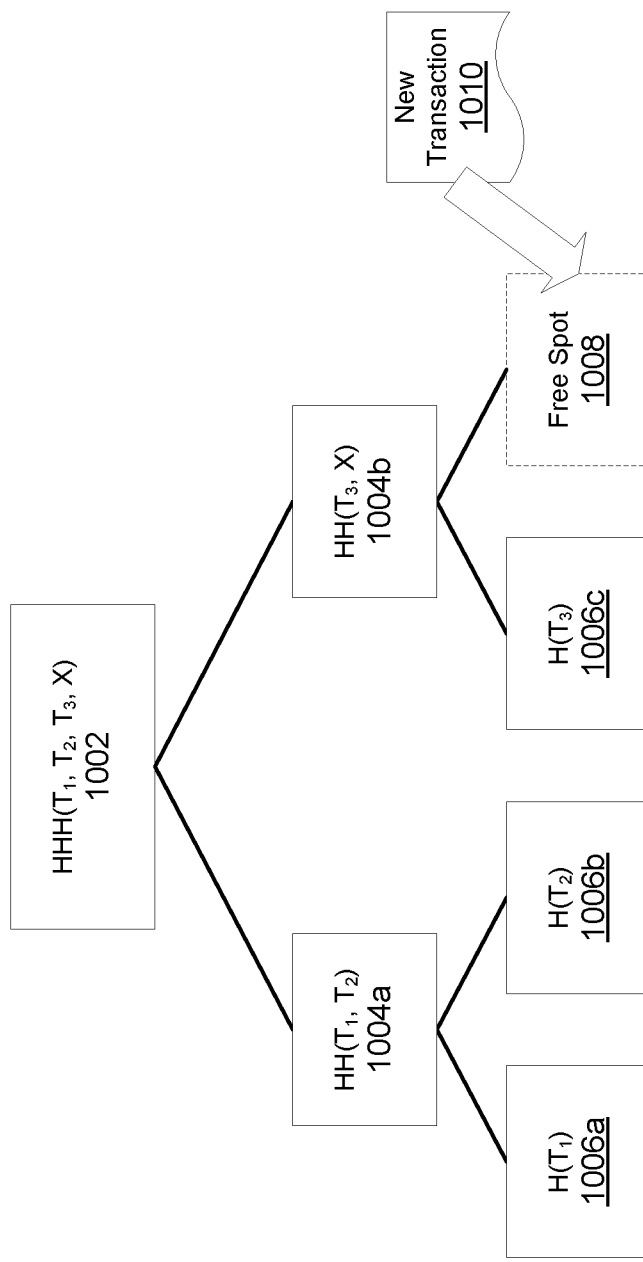
FIG. 10 illustrates an example of a hash tree, in accordance with an embodiment.

At 906, the database system 100 stores a record of the transaction in the leaf level of a hash tree, at the rightmost available position. This step is related to providing the ability to cryptographically verify a transaction, and, in embodiments, occurs after or independently of the commitment of the transaction. FIG. 10 depicts an example embodiment of a hash tree. In general, as used herein, a hash tree is a tree data structure in which each node of the tree comprises a cryptographic hash, or other form of digital signature. For example, a hash tree may correspond to a data structure in which each node leaf node comprises a hash of one or more attributes of a transaction, and every non-leaf node comprises a hash that is based on its child nodes.

At 908, nodes representing the hash of an attribute of the transaction are stored, in embodiments, at the rightmost available position at the leaf level of a hash tree. The leaf-level of the hash tree thus fills from rightmost position outwards, such that the rightmost region of the tree may be considered an active or unstable zone which can be updated when a new transaction is added. Other regions of the tree, having been completed by the filling of all descendent leaf nodes, may be considered stable.

At 910, the database system 100 receives a request to verify a transaction. In embodiments, data is received at a network buffer, read by operating system components, and provided to a query processor of the database system. The query processor may then determine that the data represents a request to verify a transaction. In embodiments, the request is presented as a type of journal query.

At 912, the database system retrieves hash values from a region associated with a path to the node representing transaction. In an embodiment, the region comprises the path traversed from an ancestor node to the node representing the transaction. The ancestor node, in an embodiment, can correspond to a stable root position, or to a root position is unstable, but at least partly reflects the composition of one or more finalized descendent nodes. The use of an unstable root node can permit verification of the ordering of a transaction in cases where an insufficient number of subsequent transactions have been received. This is because, as the tree structure grows, there may be an increasing interval of time between the addition and finalization of a root node. The region further comprises, in an embodiment, sibling nodes reachable on the traversal path. For example, with respect to FIG. 10, a traversal from a node 1006b to a stable root (e.g., node 1004a), an embodiment might also provide hash values from the sibling node 1006a. A traversal might also include the unstable root, at 1002. Traversals might also proceed in both directions, e.g. from the root to a leaf node, or vice versa.

Step 914 depicts verification of the transaction based on the retrieved hash values. Embodiments may support verification of a transaction in a number of ways. In an embodiment, the ordering of the transaction is verified based on one or more of inspection, sequencing, and reconstruction of the retrieved hash values. As noted, these may include, in an embodiment, hash values retrieved on a path traversed from an ancestor node to the node representing the transaction (or the reverse, i.e., from the node representing the transaction to the stable ancestor). These may also include, as noted, sibling nodes reachable on the traversal path. Embodiments may also support verification of the integrity of the contents of the transaction. This may be done by verifying the validity of the hash values, e.g., by reconstructing a hash value based at least in part on an attribute of the transaction. It may also be done, in embodiments, by confirming the validity of a digital signature of the transaction record. Hash values for both finalized regions, stable root nodes, and unstable root nodes may also be published and consulted in order to verify the order of a transaction.

The example process 900 of FIG. 9 may be further understood in view of FIG. 10, which illustrates an example of a hash tree, in accordance with an embodiment. The example hash tree 1000 of FIG. 10 comprises a plurality of nodes 1002-1006a-c organized into a tree structure. For illustrative purposes, a binary tree structure is shown. However, a variety of other structures, such as non-binary trees and certain types of graphs, may also be used.

The nodes 1002-1006a-c of may be categorized as leaf nodes 1006a-c and non-leaf nodes 1002-1004. As can be seen in FIG. 10, the leaf nodes 1006a-c are those without descendant nodes. In embodiments, the leaf nodes 1006a-c each comprise a cryptographic hash value, depicted in FIG. 10 as $H(T_1)$, $H(T_2)$, and $H(T_3)$. Here, $T_1$, $T_2$, and $T_3$ represent transactions. $H(T_n)$ represents a hash value computed from one or more attributes of a transaction $T_n$.

In embodiments, nodes are added to the rightmost available position in the leaf level of a hash tree. In FIG. 10, this is depicted by the "Free Spot" 1008, to which an entry will be added based on a new transaction 1010. The leaf-level of the hash tree is filled from rightmost position and moves outward, such that the rightmost edge or region of the tree is considered an active or unstable zone which is subjection to change when a new transaction is added.

The non-leaf nodes of the hash tree 1000 are computed, in embodiments, based on the hashes computed at lower levels of the hash tree 1000. For example, the first ancestor node 1004a of the leftmost two leaf-level nodes 1006a,b may be computed by taking a hash of a combination of $H(T_1)$ and $H(T_2)$. This is designated in FIG. 10 as $HH(T_1, T_2)$. $HH(T_1, T_2)$ may be calculated as $H(H(T_1), (H(T_2))$, i.e., as a hash based on the hashes of the child nodes.

Likewise, the current root node 1002 of the depicted hash tree 1000 may be computed from $HH(T_1, T_2)$ and a similarly computed value from the right branch of the current root node 1002. Note, however, that the right branch, as depicted in FIG. 10, is currently based in part on a free spot 1008 which has no corresponding hash value. Consequently, its ancestor nodes 1005b, 1002 can both be described as unstable, based on the system re-computing their values once a hash value derived from the new transaction 1010 fills the free spot 1008.

As may be seen in FIG. 10, when the free spot 1008 is occupied by a hash derived from an attribute of the new transaction 1010, the tree will be full. However, the tree can be expanded by the addition of new nodes. In some embodiments, new nodes are added along the right side of the graph, such that the current root node 1002 is demoted to a child status and a new, initially unpopulated region of noes is created on the right side of the tree. These nodes can then be populated as new transactions are committed.

A node in the tree can be described as a stable root if it is a non-leaf node whose hash value will no longer change. For example, in FIG. 10, the node 1004a is stable because its child nodes have been filled, and as such its stored hash value $HH(T_1, T_2)$ will not subsequently change. A traversal from a node representing a transaction to a stable root may provide, in embodiments, information sufficient to verify the ordering of a transaction. In other words, this information may be used to ensure that the indicated order of a transaction has not been altered since it was originally recorded. For example, inserting or deleting records of a transaction would constitute tampering with the order, but this can be detected based on nodes retrieved during a traversal between a leaf-level node representing the transaction in question, and a stable root node. For example, a traversal from a node 1006b to a stable root (e.g., node 1004a), can provide information sufficient to verify the ordering of the transaction $T_2$. The information can include hash values for the nodes on the path between the leaf level node and the stable root, and may also include values for the sibling node 1006a.

Figure 11:
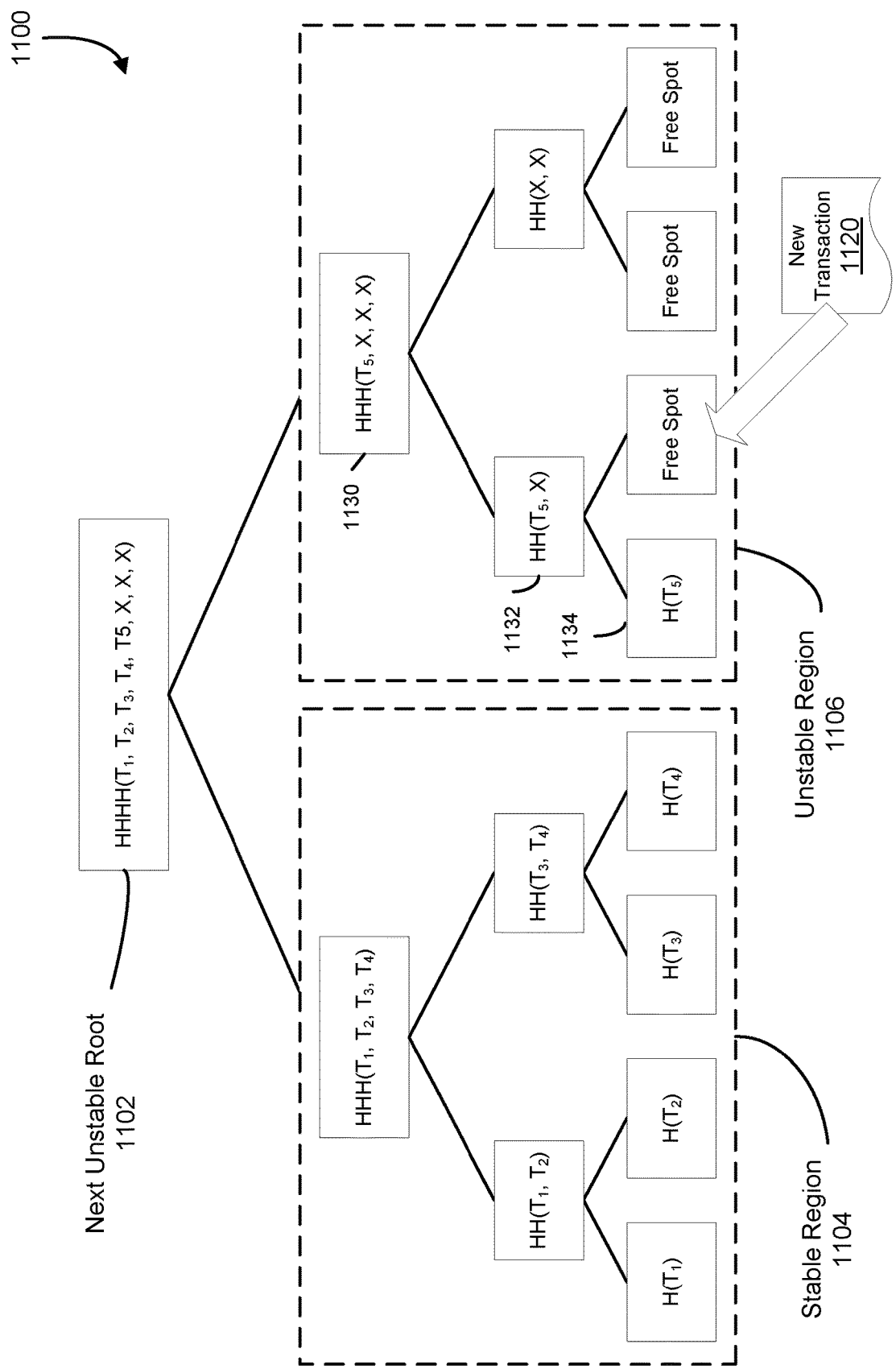
FIG. 11 illustrates further aspects of the example hash tree, in accordance with an embodiment.

FIG. 11 illustrates further aspects of the example hash tree, in accordance with an embodiment. In particular, FIG.

11 is intended to illustrate aspects of expanding the hash tree to accommodate new transactions once the last remaining free spot has been filled.

In the example of FIG. 11, a new region 1106 has been added to the tree, and is associated with the original region 1104 by a new root node 1102. The new root node 1102 is described in FIG. 11 as being the next unstable root. The node 1102 is described as unstable because its right branch has not yet been filled with transactions at the leaf level, and therefore contains a number of values in non-leaf nodes which will be updated as new transactions are recorded. It can be described as the next unstable root because the hash trees depicted in FIGS. 10 and 11 can be described, at least conceptually, as comprising an indefinite number of root nodes that have yet to be made stable by the addition of a sufficient number of transactions. For example, when the currently unstable region 1106 of the tree 1100 has been filled, then a new parent node can be inserted at the root, comprising an empty rightward branch.

In the example of FIG. 11, the leaf nodes in the stable region 1104 have all been filled with hashes based on the attributes of transactions, and their ancestor nodes filled with further hashes derived from the leaf nodes. On the right side, however, the unstable region 1106 contains only a single finalized leaf node, whose value is indicated as $H(T_5)$. None of this node's ancestors are stable. Once a hash value for the new transaction 1120 has been added, however, the parent node can be finalized.

Once a region has been finalized, its hash values can be published. Publishing the hash values refers to making them accessible to an appropriately wide distribution, such as making the hash values available to the public via a hosted data storage service, providing the hash values to a third party service, and so on. Embodiments may also publish the state of the tree prior to a region being finalized. The published nodes in this case can comprise a path to a leaf-node entry, some of which may be unfinalized. For example, the nodes might include the unstable root node 1102, the top node 1130 in the unstable region 1106, that node's left child node 1132, and the node 1134 representing the transaction $T_5$. The hash values are published even though they are computed with values representing "null" or "empty" transactions, and are sufficient to verify the order of the transaction. The hash values on this path may be published subsequently as new transactions are finalized, and when the entire path or region has been finalized.

Figure 12:
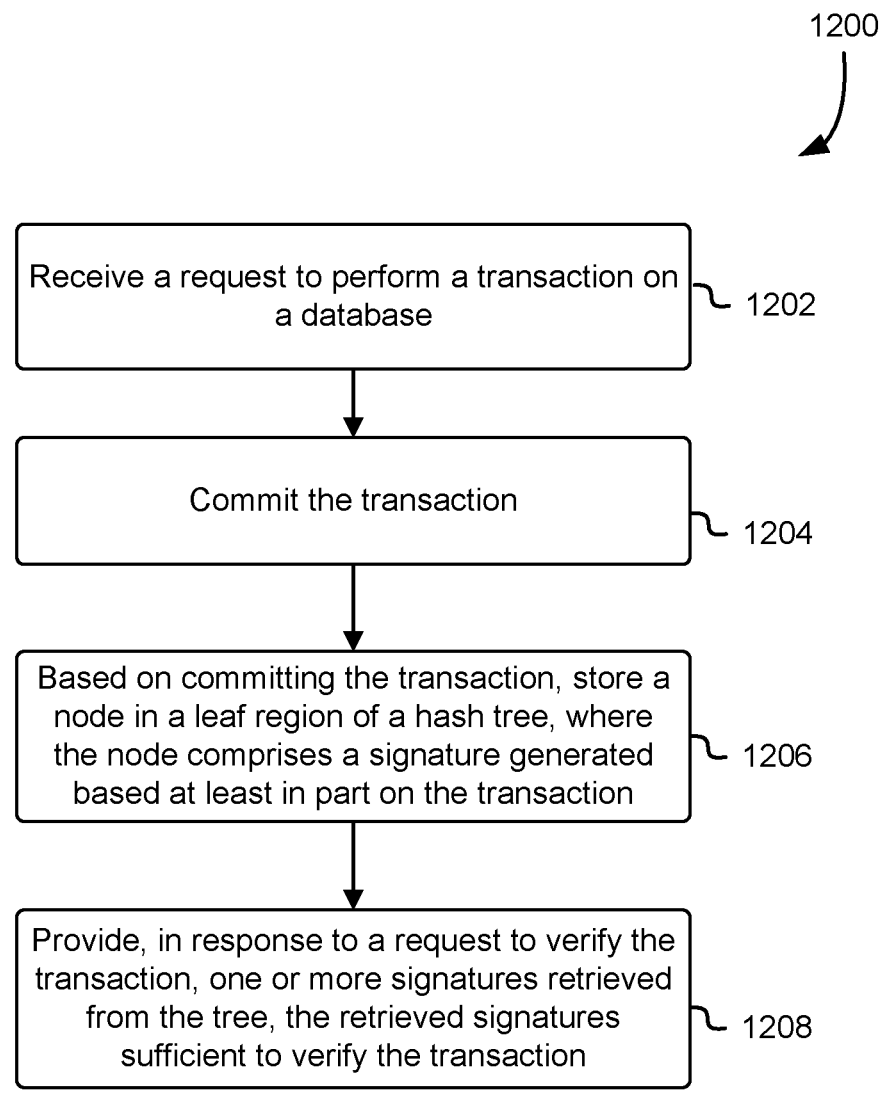
FIG. 12 illustrates a process for providing cryptographic verification of a transaction.

FIG. 12 illustrates a process for providing cryptographic verification of a transaction. Although FIG. 12 is depicted as a sequence of steps, the depicted sequence should not be construed as limiting the scope of the present disclosure to only those embodiments conforming to the depicted order. For example, unless otherwise indicated or clear from context (e.g., when the output of one step is used as input into another), at least some of the depicted steps may be reordered or performed in parallel. The example process 1200 may be performed by a database system, such as the database system depicted in FIG. 1.

Step 1202 depicts receiving a request to perform a transaction on a database system, such as the database system depicted in FIG. 1. In an embodiment, the request is provide as one or more query language commands, which are received and processed by a query processor, such as the one depicted in FIG. 1.

Step 1204 depicts committing the transaction. Note that the transaction is committed independently of the cryptographic verification process, which permits the database system to process requests at the high volume often required of such systems.

Step 1206 depicts storing a node in a leaf region of a hash tree, where the node comprises a signature, e.g., a cryptographic hash, which is generated based at least in part on the committed transaction. The node is stored based on committing the transaction. For example, in various cases and embodiments the system responds to the successful commitment of the transaction by adding the node to the hash tree. The hash tree serves the purpose of providing cryptographic verification of committed transactions. Note that, in some embodiments, uncommitted transactions may also be recorded, in the same tree or separate tree. However, attempts to commit the transaction are performed independently of the cryptographic verification, in order to achieve high transaction throughput.

As nodes are stored in the leaf region of the hash tree, the tree will eventually become filled and all of its nodes finalized. In an embodiment, when a region of the tree is finalized, the hash values stored at those nodes are published. Here, publishing the hash values can be published. Here, publishing the signatures refers to making them accessible to an appropriately wide distribution. In cases and embodiments, this may include making the signatures available to the general public. It may also include, for example, making the signatures available to a third party intermediary, an escrow service, a printed publication, journal, electronic notification services, and so forth. The database system may periodically make finalized regions of the tree, such as the stable region 1104 depicted in FIG. 11, available to such services. In some embodiments, published signatures are provided directly to subscribing entities, e.g. through a communications channel.

Step 1208 depicts providing, in response to a request to verify the transaction, one or more signatures retrieved from the hash tree. The signatures includes one or more signatures retrieved from the hash tree during a traversal of the tree to locate the node that corresponds to the transaction. The provided signatures are those sufficient to cryptographically verify the transaction. As noted, embodiments may support verification of various aspects of the integrity of a transaction, such as the ordering of the transaction and the verification of its contents. Support for verification of these aspects includes, in an embodiment, providing hash values retrieved on a path traversed from a stable ancestor node to the node representing the transaction (or the reverse, i.e., from the node representing the transaction to the stable ancestor). The provided hash values may also include, as noted, sibling nodes reachable on the traversal path. Embodiments may support verification of the integrity of the contents of the transaction, by various means, such as by providing support for the verifying entity to reconstruct a hash value based at least in part on an attribute of the transaction. In cases and embodiments, the verifying entity may verify the contents of a transaction by confirming the validity of a digital signature of the transaction record.

Figure 13:
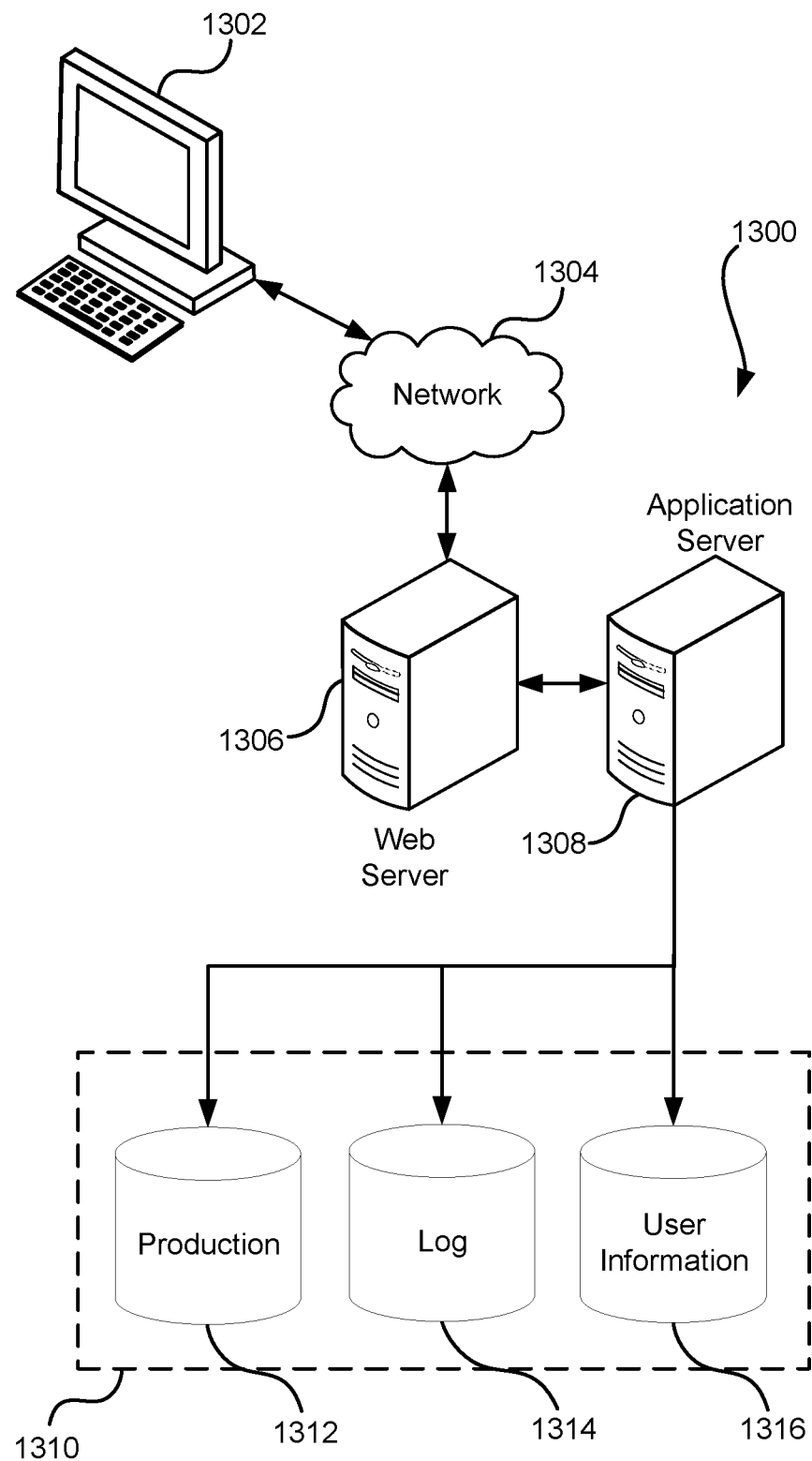
FIG. 13 illustrates a system in which various embodiments can be implemented.

FIG. 13 illustrates aspects of an example system 1300 for implementing aspects in accordance with an embodiment. As will be appreciated, although a web-based system is used for purposes of explanation, different systems may be used, as appropriate, to implement various embodiments. In an embodiment, the system includes an electronic client device 1302, which includes any appropriate device operable to send and/or receive requests, messages, or information over an appropriate network 1304 and convey information back to a user of the device. Examples of such client devices include personal computers, cellular or other mobile phones, handheld messaging devices, laptop computers, tablet computers, set-top boxes, personal data assistants, embedded computer systems, electronic book readers, and the like. In an embodiment, the network includes any appropriate network, including an intranet, the Internet, a cellular network, a local area network, a satellite network or any other such network and/or combination thereof, and components used for such a system depend at least in part upon the type of network and/or system selected. Many protocols and components for communicating via such a network are well known and will not be discussed herein in detail. In an embodiment, communication over the network is enabled by wired and/or wireless connections and combinations thereof. In an embodiment, the network includes the Internet and/or other publicly addressable communications network, as the system includes a web server 1306 for receiving requests and serving content in response thereto, although for other networks an alternative device serving a similar purpose could be used as would be apparent to one of ordinary skill in the art.

In an embodiment, the illustrative system includes at least one application server 1308 and a data store 1310, and it should be understood that there can be several application servers, layers or other elements, processes or components, which may be chained or otherwise configured, which can interact to perform tasks such as obtaining data from an appropriate data store. Servers, in an embodiment, are implemented as hardware devices, virtual computer systems, programming modules being executed on a computer system, and/or other devices configured with hardware and/or software to receive and respond to communications (e.g., web service application programming interface (API) requests) over a network. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered system. Data stores, in an embodiment, communicate with block-level and/or object-level interfaces. The application server can include any appropriate hardware, software and firmware for integrating with the data store as needed to execute aspects of one or more applications for the client device, handling some or all of the data access and business logic for an application.

In an embodiment, the application server provides access control services in cooperation with the data store and generates content including but not limited to text, graphics, audio, video and/or other content that is provided to a user associated with the client device by the web server in the form of HyperText Markup Language ("HTML"), Extensible Markup Language ("XML"), JavaScript, Cascading Style Sheets ("CSS"), JavaScript Object Notation (JSON), and/or another appropriate client-side or other structured language. Content transferred to a client device, in an embodiment, is processed by the client device to provide the content in one or more forms including but not limited to forms that are perceptible to the user audibly, visually and/or through other senses. The handling of all requests and responses, as well as the delivery of content between the client device 1302 and the application server 1308, in an embodiment, is handled by the web server using PHP: Hypertext Preprocessor ("PHP"), Python, Ruby, Perl, Java, HTML, XML, JSON, and/or another appropriate server-side structured language in this example. In an embodiment, operations described herein as being performed by a single device are performed collectively by multiple devices that form a distributed and/or virtual system.

The data store 1310, in an embodiment, includes several separate data tables, databases, data documents, dynamic data storage schemes and/or other data storage mechanisms and media for storing data relating to a particular aspect of the present disclosure. In an embodiment, the data store illustrated includes mechanisms for storing production data 1312 and user information 1316, which are used to serve content for the production side. The data store also is shown to include a mechanism for storing log data 1314, which is used, in an embodiment, for reporting, computing resource management, analysis or other such purposes. In an embodiment, other aspects such as page image information and access rights information (e.g., access control policies or other encodings of permissions) are stored in the data store in any of the above listed mechanisms as appropriate or in additional mechanisms in the data store 1310.

The data store 1310, in an embodiment, is operable, through logic associated therewith, to receive instructions from the application server 1308 and obtain, update or otherwise process data in response thereto, and the application server 1308 provides static, dynamic, or a combination of static and dynamic data in response to the received instructions. In an embodiment, dynamic data, such as data used in web logs (blogs), shopping applications, news services, and other such applications, are generated by server-side structured languages as described herein or are provided by a content management system ("CMS") operating on or under the control of the application server. In an embodiment, a user, through a device operated by the user, submits a search request for a certain type of item. In this example, the data store accesses the user information to verify the identity of the user, accesses the catalog detail information to obtain information about items of that type, and returns the information to the user, such as in a results listing on a web page that the user views via a browser on the user device 1302. Continuing with example, information for a particular item of interest is viewed in a dedicated page or window of the browser. It should be noted, however, that embodiments of the present disclosure are not necessarily limited to the context of web pages but are more generally applicable to processing requests in general, where the requests are not necessarily requests for content. Example requests include requests to manage and/or interact with computing resources hosted by the system 1300 and/or another system, such as for launching, terminating, deleting, modifying, reading, and/or otherwise accessing such computing resources.

In an embodiment, each server typically includes an operating system that provides executable program instructions for the general administration and operation of that server and includes a computer-readable storage medium (e.g., a hard disk, random access memory, read only memory, etc.) storing instructions that, if executed by a processor of the server, cause or otherwise allow the server to perform its intended functions (e.g., the functions are performed as a result of one or more processors of the server executing instructions stored on a computer-readable storage medium).

The system 1300, in an embodiment, is a distributed and/or virtual computing system utilizing several computer systems and components that are interconnected via communication links (e.g., transmission control protocol (TCP) connections and/or transport layer security (TLS) or other cryptographically protected communication sessions), using one or more computer networks or direct connections.

However, it will be appreciated by those of ordinary skill in the art that such a system could operate in a system having fewer or a greater number of components than are illustrated in FIG. 13. Thus, the depiction of the system 1300 in FIG. 13 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. In an embodiment, user or client devices include any of a number of computers, such as desktop, laptop or tablet computers running a standard operating system, as well as cellular (mobile), wireless and handheld devices running mobile software and capable of supporting a number of networking and messaging protocols, and such a system also includes a number of workstations running any of a variety of commercially available operating systems and other known applications for purposes such as development and database management. In an embodiment, these devices also include other electronic devices, such as dummy terminals, thin-clients, gaming systems and other devices capable of communicating via a network, and virtual devices such as virtual machines, hypervisors, and software containers utilizing operating-system level virtualization and other virtual devices or non-virtual devices supporting virtualization capable of communicating via a network.

In an embodiment, a system utilizes at least one network that would be familiar to those skilled in the art for supporting communications using any of a variety of commercially available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and other protocols. The network, in an embodiment, is a local area network, a wide-area network, a virtual private network, the Internet, an intranet, an extranet, a public switched telephone network, an infrared network, a wireless network, a satellite network, and any combination thereof. In an embodiment, a connection-oriented protocol is used to communicate between network endpoints such that the connection-oriented protocol (sometimes called a connection-based protocol) is capable of transmitting data in an ordered stream. In an embodiment, a connection-oriented protocol can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In an embodiment, the system utilizes a web server that runs one or more of a variety of server or mid-tier applications, including Hypertext Transfer Protocol ("HTTP") servers, FTP servers, Common Gateway Interface ("CGI") servers, data servers, Java servers, Apache servers, and business application servers. In an embodiment, the one or more servers are also capable of executing programs or scripts in response to requests from user devices, such as by executing one or more web applications that are implemented as one or more scripts or programs written in any programming language, such as Java®, C, C# or C++, or any scripting language, such as Ruby, PHP, Perl, Python or TCL, as well as combinations thereof. In an embodiment, the one or more servers also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. In an embodiment, a database server includes table-based servers, document-based servers, unstructured servers, relational servers, non-relational servers, or combinations of these and/or other database servers.

In an embodiment, the system includes a variety of data stores and other memory and storage media as discussed above which can reside in a variety of locations, such as on a storage medium local to (and/or resident in) one or more of the computers or remote from any or all of the computers across the network. In an embodiment, the information resides in a storage-area network ("SAN") familiar to those skilled in the art and, similarly, any necessary files for performing the functions attributed to the computers, servers or other network devices are stored locally and/or remotely, as appropriate. In an embodiment where a system includes computerized devices, each such device can include hardware elements that are electrically coupled via a bus, the elements including, for example, at least one central processing unit ("CPU" or "processor"), at least one input device (e.g., a mouse, keyboard, controller, touch screen, or keypad), at least one output device (e.g., a display device, printer, or speaker), at least one storage device such as disk drives, optical storage devices, and solid-state storage devices such as random access memory ("RAM") or read-only memory ("ROM"), as well as removable media devices, memory cards, flash cards, etc., and various combinations thereof.

In an embodiment, such a device also includes a computer-readable storage media reader, a communications device (e.g., a modem, a network card (wireless or wired), an infrared communication device, etc.), and working memory as described above where the computer-readable storage media reader is connected with, or configured to receive, a computer-readable storage medium, representing remote, local, fixed, and/or removable storage devices as well as storage media for temporarily and/or more permanently containing, storing, transmitting, and retrieving computer-readable information. In an embodiment, the system and various devices also typically include a number of software applications, modules, services, or other elements located within at least one working memory device, including an operating system and application programs, such as a client application or web browser. In an embodiment, customized hardware is used and/or particular elements are implemented in hardware, software (including portable software, such as applets), or both. In an embodiment, connections to other computing devices such as network input/output devices are employed.

In an embodiment, storage media and computer readable media for containing code, or portions of code, include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood however, that there is no intention to limit the invention to the specific form or forms disclosed but, on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. Similarly, use of the term "or" is to be construed to mean "and/or" unless contradicted explicitly or by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal. The use of the phrase "based on," unless otherwise explicitly stated or clear from context, means "based at least in part on" and is not limited to "based solely on."

Conjunctive language, such as phrases of the form "at least one of A, B, and C," or "at least one of A, B and C," (i.e., the same phrase with or without the Oxford comma) unless specifically stated otherwise or otherwise clearly contradicted by context, is otherwise understood within the context as used in general to present that an item, term, etc., may be either A or B or C, any nonempty subset of the set of A and B and C, or any set not contradicted by context or otherwise excluded that contains at least one A, at least one B, or at least one C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}, and, if not contradicted explicitly or by context, any set having {A}, {B}, and/or {C} as a subset (e.g., sets with multiple "A"). Thus, such conjunctive language is not generally intended to imply that certain embodiments require at least one of A, at least one of B and at least one of C each to be present. Similarly, phrases such as "at least one of A, B, or C" and "at least one of A, B or C" refer to the same as "at least one of A, B, and C" and "at least one of A, B and C" refer to any of the following sets: {A}, {B}, {C}, {A, B}, {A, C}, {B, C}, {A, B, C}, unless differing meaning is explicitly stated or clear from context. In addition, unless otherwise noted or contradicted by context, the term "plurality" indicates a state of being plural (e.g., "a plurality of items" indicates multiple items). The number of items in a plurality is at least two but can be more when so indicated either explicitly or by context.

Operations of processes described herein can be performed in any suitable order unless otherwise indicated herein or otherwise clearly contradicted by context. In an embodiment, a process such as those processes described herein (or variations and/or combinations thereof) is performed under the control of one or more computer systems configured with executable instructions and is implemented as code (e.g., executable instructions, one or more computer programs or one or more applications) executing collectively on one or more processors, by hardware or combinations thereof. In an embodiment, the code is stored on a computer-readable storage medium, for example, in the form of a computer program comprising a plurality of instructions executable by one or more processors. In an embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In an embodiment, code (e.g., executable code or source code) is stored on a set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media, in an embodiment, comprises multiple non-transitory computer-readable storage media, and one or more of individual non-transitory storage media of the multiple non-transitory computer-readable storage media lack all of the code while the multiple non-transitory computer-readable storage media collectively store all of the code. In an embodiment, the executable instructions are executed such that different instructions are executed by different processors—for example, in an embodiment, a non-transitory computer-readable storage medium stores instructions and a main CPU executes some of the instructions while a graphics processor unit executes other instructions. In another embodiment, different components of a computer system have separate processors and different processors execute different subsets of the instructions.

Accordingly, in an embodiment, computer systems are configured to implement one or more services that singly or collectively perform operations of processes described herein, and such computer systems are configured with applicable hardware and/or software that enable the performance of the operations. Further, a computer system, in an embodiment of the present disclosure, is a single device and, in another embodiment, is a distributed computer system comprising multiple devices that operate differently such that the distributed computer system performs the operations described herein and such that a single device does not perform all operations.

The use of any and all examples or exemplary language (e.g., "such as") provided herein is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate, and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references including publications, patent applications, and patents cited herein are hereby incorporated by reference to the same extent as if each reference were individually and specifically indicated to be incorporated by reference and were set forth in its entirety herein.

What is claimed is:

1. A system, comprising:
   at least one processor; and
   at least one memory comprising instructions that, in response to being executed by the at least one processor, cause a database, of the system, to at least:
   receive a request to perform a transaction;
   commit the transaction;
   based at least in part on commitment of the transaction, store a first node in a leaf region of a tree structure, the first node comprising a first signature generated based at least in part on the transaction; and
   provide, in response to a request to verify the transaction, a plurality of signatures comprising signatures retrieved on a path of nodes of the tree structure between an ancestor node of the tree structure and the first node, wherein a signature of the ancestor node is generated based at least in part on the first signature and at least one other signature associated with a node on the path.

2. The system of claim 1, wherein verification of the transaction comprises generation of a new signature of the transaction for comparison to the plurality of signatures.

3. The system of claim 1, the at least one memory comprising instructions that, in response to being executed by the at least one processor, cause the database, of the system, to at least:
   provide signatures of nodes from a region associated with a path to a node representing the transaction, wherein at least one of the nodes on the path has a signature based at least in part on an unfinalized node.

4. The system of claim 1, wherein the first signature is generated based at least in part on a cryptographic hash of one or more attributes of a committed transaction.

5. The system of claim 1, wherein the tree structure is partitioned between a plurality of storage nodes.

6. A computer-implemented method, comprising:
   committing a transaction on a collection of data maintained by a database;
   storing, based at least in part on commitment of the transaction, a first node in a leaf region of a tree, the first node comprising a first signature generated based at least in part on the transaction; and
   providing a plurality of signatures corresponding to signatures retrieved by traversing between the first node and a second node of the tree, wherein the second node comprises a second signature generated based at least in part on the first signature.

7. The method of claim 6, further comprising:
   verifying an order of the transaction in a sequence of transactions, based on the plurality of signatures.

8. The method of claim 6, further comprising:
   publishing signatures of nodes on a path to the transaction.

9. The method of claim 8, wherein publishing the signatures comprises copying the signatures to a public storage location.

10. The method of claim 6, wherein the second node corresponds to an ancestor node of the tree, and the plurality of signatures comprises signatures of sibling nodes retrieved based on the traversal.

11. The method of claim 6, wherein the transaction is committed to the database prior to storing the first node in the tree.

12. The method of claim 6, wherein the tree is partitioned among a plurality of storage nodes.

13. The method of claim 6, further comprising:
   providing access to the plurality of signatures based at least in part on a query of a journal table.

14. A non-transitory computer-readable storage medium having stored thereon executable instructions that, as a result of being executed by one or more processors of a computer system, cause the computer system to at least:
   commit a transaction on a collection of data maintained by a database;
   store, based at least in part on commitment of the transaction, a first node in a leaf region of a tree, the first node comprising a hash value generated based at least in part on the transaction; and
   provide a plurality of hash values corresponding to hash values retrieved in a traversal between the first node and a second node of the tree, wherein the second node comprises a second hash value computed based at least in part on the hash value and at least one other hash value associated with a node visited in the traversal.

15. The non-transitory computer-readable storage medium of claim 14, wherein the instructions further comprise instructions that, as a result of being executed by the one or more processors, cause the computer system to at least:
   verify the transaction by at least generating a new hash value of the transaction for comparison to the plurality of hash values.

16. The non-transitory computer-readable storage medium of claim 14, wherein the an order of the transaction in a sequence of transactions is verified based on the one or more hash values.

17. The non-transitory computer-readable storage medium of claim 14, wherein the instructions further comprise instructions that, as a result of being executed by the one or more processors, cause the computer system to at least:

publish a region of the tree, the region comprising a path to a leaf node of the tree.

18. The non-transitory computer-readable storage medium of claim 14, wherein the hash value is based at least in part on a cryptographic hash of one or more attributes of a committed transaction.

19. The non-transitory computer-readable storage medium of claim 14, wherein the transaction is committed to the database prior to storing the first node in the tree.

20. The non-transitory computer-readable storage medium of claim 14, wherein the instructions further comprise instructions that, as a result of being executed by the one or more processors, cause the computer system to at least:

provide access to the one or more hash values based at least in part on a query of a journal table.

* * * * *